3,464,905
SILENT DISCHARGE NITROSATION
OF HYDROCARBONS
Robert Fuhrmann, Morris Plains, Stylianos Sifniades, Parsippany, and Emery C. Lazar, Morristown, N.J., assignors to Allied Chemical Corporation, New York, N.Y., a corporation of New York
No Drawing. Filed Feb. 14, 1967, Ser. No. 615,908
Int. Cl. C07c 3/24; B01k 1/00
U.S. Cl. 204—168                                    5 Claims

ABSTRACT OF THE DISCLOSURE

Nitrosation of alkyl and cycloalkyl hydrocarbons by nonaqueous nitrosating agents such as nitric oxide, nitrosyl chloride, nitric oxide and chlorine, and mixtures of nitric oxide and nitrosyl chloride is catalyzed by silent electric discharges. In the presence of excess gaseous hydrogen chloride the reaction product is the alkyl or cycloalkyl oxime hydrochloride.

---

This invention relates to a process for nitrosating alkyl and cycloalkyl hydrocarbons under the influence of silent electric discharges. More particularly, this invention relates to the electric discharge catalyzed reaction of alkyl and cycloalkyl hydrocarbons under substantially anhydrous conditions with nitrosating agents such as nitric oxide, nitrosyl chloride, nitric oxide and chlorine and mixtures of nitrosyl chloride and nitric oxide to produce nitrosoalkanes and nitrosocycloalkanes. Additionally, any of the above nitrosating agents may be used in conjunction with gaseous hydrogen chloride to produce alkyl and cycloalkyl oxime hydrochlorides.

The nitroso or oxime hydrochloride derivatives of alkanes and cycloalkanes produced by the process of this invention are useful intermediates in the preparation of amides, amines, and ketones. Where cyclohexane is the hydrocarbon nitrosated, the resultant nitroso cyclohexane or cyclohexanone oxime may be caused to undergo the Beckmann rearrangement affording ε-caprolactam which forms nylon 6 on polymerization.

Aliphatic hydrocarbons have hitherto been nitrosated using a variety of initiation techniques, all of which have significant shortcomings. For example, chemical initiation, e.g. with peroxides or azo catalysts, contaminates the product and necessitates a final purification thereof; initiation by light provides very inefficient utilization of power input and requires frequent and expensive lamp replacement; initiation by radiation requires elaborate shielding and other safety precautions; thermally initiated nitrosation leads to intractable reaction mixtures and tars at the initiation temperatures required It is, therefore, a primary objective of this invention to provide a novel, safe and efficient process for the nitrosation of alkyl and cycloalkyl hydrocarbons. It is a further object of this invention to provide a nitrosation process whereby elaborate purification of starting materials and reaction products is unnecessary. Further objects and advantages will become apparent from the description of the invention which follows in greater detail.

It has now been found in accordance with this invention that so-called silent or corona electric discharge is an excellent means of initiating nitrosation of hydrocarbons in the liquid or gas phase. Silent discharge, frequently also called corona discharge, as herein used, connotes a flow of current between two oppositely charged electrodes which are separated by a gap and at least one and preferably two dielectric barriers. A detailed discussion of the principles of silent discharge may be found in The Encyclopedia of Electrochemistry, edited by C. A. Hampel, Reinhold (1964).

According to the invention, a mixture of an alkyl or cycloalkyl hydrocarbon and a nonaqueous nitrosating agent is subjected to a corona electric discharge whereby nitrosation of the organic substrate occurs. Suitable examples of nitrosating agents include nitric oxide, nitrosyl chloride, nitric oxide with chlorine, nitric oxide and nitrosyl chloride, nitric oxide with hydrogen chloride, nitric oxide with chlorine and hydrogen chloride, nitric oxide and nitrosyl chloride with hydrogen chloride and nitrosyl chloride with hydrogen chloride.

The overall reaction may be represented as follows:

(A) 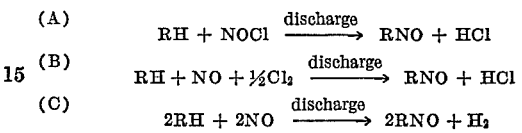

(B)

(C)

wherein R is an alkyl or cycloalkyl radical. The nitroso alkane product generally exists in equilibrium with a dimeric form.

$$2RNO \rightleftharpoons (RNO)_2$$

If excess gaseous hydrogen chloride is used in conjunction with any of the foregoing nitrosating agents, the resulting product is the oxime hydrochloride instead of the nitroso compound. This is believed to arise by hydrogen chloride and discharge catalyzed isomerization of the nitroso alkane as soon as it is formed:

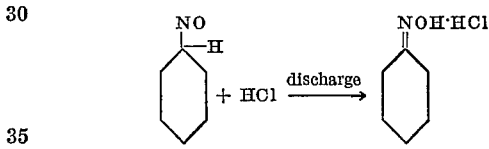

using cyclohexanone oxime as an example.

An HCl/nitrosating agent molar ratio of at least 2.0 is required to form the oxime hydrochloride. If excess HCl is not added along with the nitrosating agent, no formation of the oxime occurs notwithstanding the fact that 1 mole of HCl is produced when using nitrosyl chloride or nitric oxide and chlorine as the nitrosating agent.

While it is understood that the invention is not bound by theory, the following reaction mechanisms for the nitrosation seem most probable:

A. With nitrosyl chloride

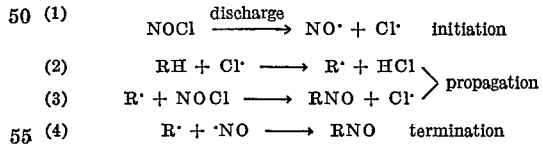

B. With nitric oxide and chlorine

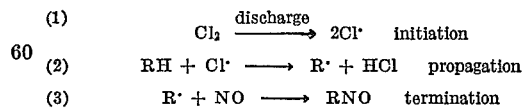

C. With nitric oxide

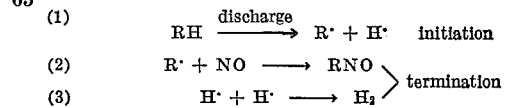

With a mixture of nitrosylchloride and nitric oxide reaction schemes A and C occur concurrently.

The alkyl and cycloalkyl compounds which may be reacted according to the process of this invention include a plurality of saturated hydrocarbons, linear, branched and cyclic. Representative compounds include methane, ethane, propane, normal and isobutane, hexane, heptane, octane, decane, dodecane, hexadecane, eicosane, and the like, cyclohexane, methylcyclohexane, cyclooctane, cyclododecane or mixtures thereof, and the like. In the preferred embodiment of this invention the alkane is cyclohexane.

In carrying out the process of the present invention the organic substrate can be reacted in solution in an inert solvent such as a perchlorinated aliphatic or chlorinated aromatic hydrocarbon. Preferably, it is reacted neat in either the gaseous or the liquid state. The preferred temperature limits of the process are between about −20° C. and about 80° C. Above 80° C. thermal initiation accompanied by extensive formation of byproducts occurs. Below about −20° C. the reaction proceeds at a relatively slow rate.

Virtually any desired degree of nitrosation can be achieved by recirculation of the organic substrate through the discharge zone until the desired degree of nitrosation is achieved.

An inert diluent gas such as helium may be used with the nitrosating agent; a suitable ratio being from about 0.5 to about 2.0 to 1.

In carrying out the process of the invention, the desired alkane is saturated with nitrosating agent and then circulated through the discharge zone. Additional nitrosating agent is bubbled through the alkane to insure that it remains saturated with nitrosating agent at all times.

Although the nitrosation reaction may be carried out at virtually any attainable pressure, a practical operating pressure range is from about 0.1 to about 10 atmospheres with the preferred operating range being about 0.2 to about 2 atmospheres. Below about 0.1 atmosphere pressure an unduly large reactor volume is required and it is difficult to avoid outside contamination from leaks. Above about 10 atmospheres it is difficult to maintain the electric discharge.

Likewise, although virtually any attainable field strength, above the breakdown voltage of the gas phase in the gap, and any current frequency is usable for producing a silent discharge, the practical limitations on readily available equipment impose somewhat narrower limitations on these two reaction parameters. A suitable electric field strength is from about 3,000 to about 300,000 volts root-mean-square/cm. and preferably from about 10,000 to about 80,000 volts R.M.S./cm. Below about 3,000 volts R.M.S./cm. it is often difficult to maintain the discharge and above about 300,000 volts R.M.S./cm. special insulation appears necessary and excessive wear of the dielectrics occurs. A current frequency from about 25 to about 300,000 cycles/sec. and preferably about 60 to about 15,000 c.p.s. may be used. Above about 300,000 c.p.s. arcing is a serious problem and below about 25 c.p.s. power input to the electrodes is impracticably low.

A discharge gap of from about 0.1 to about 5.0 cm. may be used, preferably about 0.2 to about 0.6 cm. Above about 5.0 cm. an impracticably high voltage is required to maintain the operative electric field strength limits, while below about 0.1 cm. it is mechanically difficult to uniformly maintain gaps.

The invention can be more fully understood by reference to the following examples.

In all experiments care was taken to exclude light as soon as the reactants had been intermixed so that photochemical initiation of the reaction would be precluded and only discharge initiation would take place.

EXAMPLE 1

560 grams of cyclohexane (99% purity) were first saturated with nitric oxide and then recycled for one hour at the rate of about 800 cc./min. through a modified Siemens ozonizer in which the distance between the inner and outer tubes was 3 mm. and wherein the volume of the discharge space was about 140 cc. The cyclohexane was introduced into the reactor in such a way that a film thereof covered the reactor walls at all times, while a continuous supply of nitric oxide was bubbled into the cyclohexane which insured that the cyclohexane remained saturated in nitric oxide and that the gas in the apparatus was composed essentially of nitric oxide and cyclohexane vapor at essentially atmospheric pressure. In the reactor the cyclohexane and nitric oxide were subjected to silent electric discharges with a potential difference of 10,900 volts at a frequency of 9,800 cycles per second resulting to a current of 50 to 58 milliamperes. The temperature was maintained at 50° C. to 54° C. throughout the experiment. The circulating cyclohexane was in contact with 100 grams of sulfuric acid, density 1.84 g./cc., situated outside the discharge zone. At the end of one hour, 40 grams of cyclohexane had been entrained by the exit gases and was collected in a trap cooled at −78° C. The remaining cyclohexane was subjected to distillation under reduced pressure. 13.0 grams of oily residue were obtained which crystallized on standing. The crystals were bis-notrosocyclohexane. No crystals were obtained from the sulfuric acid layer.

EXAMPLE 2

300 grams of cyclohexane (99% purity) were first saturated with nitrosyl chloride and then recycled for 50 minutes through a modified Siemens ozonizer in which the distance between the inner and outer tubes was 4.5 mm. and wherein the volume of the discharge space was about 45 cc. The cyclohexane was fed at the bottom of the ozonizer and taken off from the top, so that the reactor gap was at all times filled with liquid cyclohexane. Simultaneously gaseous nitrosyl chloride, at the rate of 320 cc./min. measured at 25° C. and atmospheric pressure, was fed through a fritted glass at the bottom of the reactor, so that bubbles of nitrosyl chloride were at all times present in the cyclohexane filling the gap of the reactor. In the reactor cyclohexane and nitric oxide were subjected to silent electric discharges with a potential difference of 12,500 volts at a frequency of 4,400 cycles per second. About 110 watt-hours of electrical energy were consumed in the reactor. The temperature was kept at 20° to 25° C. and the pressure at about 140 mm. of mercury. The circulating cyclohexane was continuously passing through 50 cc. of sulfuric acid, density 1.84 g./cc. The acid was vigorously stirred and was kept at about 5° C. At the end of 50 minutes the discharge was stopped and the supply of nitrosyl chloride was discontinued. The cyclohexane layer was kept circulating through the sulfuric acid for ten more minutes, while the bulk of unreacted nitrosyl chloride was driven off by a stream of dry nitrogen. Treatment of the sulfuric acid layer with ice produced 1.1 grams of bis-nitrosocyclohexane. The cyclohexane layer was found to contain 3.54 grams of cyclohexyl chloride.

EXAMPLE 3

The operation of Example 2 was repeated with 320 grams of cyclohexane. The nitrosating agent was a mixture of five parts per volume nitric oxide and one part per volume chlorine supplied at the rate of 300 cc./min. The potential difference was 12,500 volts, the temperature was 20° to 25° C. and the pressure was about 100 mm. of mercury. At the end of two hours 250 watt-hours of electrical energy had been consumed in the reactor. Treatment of the sulfuric acid layer with ice produced 5.25 grams of crude bis-notrosocyclohexane, while the cyclohexane layer contained 9.0 grams of cyclohexyl chloride.

EXAMPLE 4

The operation of Example 2 was repeated with 304 grams of cyclohexane. The nitrosating agent was a mixture of one part per volume nitric oxide and four parts per volume hydrogen chloride supplied at the rate of 325 cc./min. The potential difference was 12,500 volts, the temperature was about 30° C. and the pressure was about 160 mm. of mercury. At the end of 45 minutes, 120 watt-hours of electrical energy had been consumed. Treatment of the sulfuric acid layer with ice, followed by neutralization with sodium carbonate produced 3.15 grams of cyclohexanone oxime.

EXAMPLE 5

The operation of Example 2 is repeated with 320 grams of n-dodecane. Using nitrosyl chloride, supplied at the rate of 300 cc./min. as the nitrosating agent. The potential difference is 12,500 volts, the temperature is 30° C. and the pressure about 140 mm. of mercury. At the end of one hour, 150 watt-hours of electrical energy had been consumed. Treatment of the sulfuric acid layer with ice followed by extraction with ether affords after evaporation of the ether, 3.5 grams of a yellow oil. Analysis for carbon hydrogen and nitrogen indicates that the product had an elementary composition consistent with that of nitrosododecane.

Various modifications will be apparent to one skilled in the art and it is not intended that this invention be limited to the details in the specific examples presented by way of illustration. Accordingly, the scope of the invention is limited only by the appended claims.

We claim:
1. A process for the nitrosation of alkyl and cycloalkyl hydrocarbons which comprises reacting said hydrocarbon with a substantially anhydrous nitrosating agent selected from the group consisting of nitric oxide; and nitrosyl chloride; nitric oxide with chlorine; nitric oxide and nitrosyl chloride; nitric oxide with hydrogen chloride; nitric oxide with chlorine and hydrogen chloride; nitric oxide and nitrosyl chloride with hydrogen chloride; and nitrosyl chloride with hydrogen chloride under the influence of silent electric discharges.

2. A process in accordance with claim 1 wherein said reaction is carried out at a temperature of from about −20° C. to about 80° C.

3. A process in accordance with claim 1 wherein the frequency of the current inducing the silent electrical discharge is from about 60 to about 15,000 cycles/sec. and the electric field strength is from about 3,000 to about 300,000 volts root-mean-square/cm.

4. A process in accordance with claim 1 wherein said nitrosating agent is nitrosyl chloride.

5. A process in accordance with claim 1 wherein said hydrocarbon is cyclohexane.

References Cited
UNITED STATES PATENTS

| | | | |
|---|---|---|---|
| 2,583,898 | 1/1952 | Smith | 204—177 |
| 2,879,215 | 3/1959 | Reppe | 204—162 |
| 3,205,162 | 9/1965 | MacLean | 204—177 |
| 3,256,169 | 6/1966 | Berghaus et al. | 204—177 |
| 3,393,139 | 7/1968 | Wakamatsu et al. | 204—162 |

ROBERT K. MIHALEK, Primary Examiner

U.S. Cl. X.R.

260—566, 647; 204—177